United States Patent [19]

Hrovat

[11] Patent Number: 5,033,573
[45] Date of Patent: Jul. 23, 1991

[54] WHEEL SLIP CONTROL UTILIZING ACTIVE SUSPENSION

[75] Inventor: Davorin D. Hrovat, Dearborn, Mich.

[73] Assignee: Ford Motor Company, Dearborn, Mich.

[21] Appl. No.: 403,688

[22] Filed: Sep. 5, 1989

[51] Int. Cl.$^5$ .................. B60G 17/00; B60K 28/16
[52] U.S. Cl. .................... 180/197; 280/6.1;
280/689; 280/772; 364/424.05; 364/426.02;
364/426.03; 364/431.05
[58] Field of Search ........... 180/197; 280/707, 772,
280/689, 840, 6.1; 364/426.02, 426.03, 424.05,
431.05

[56] References Cited

U.S. PATENT DOCUMENTS

| | | | |
|---|---|---|---|
| 4,721,176 | 1/1988 | Kabasin et al. | 180/197 |
| 4,771,848 | 9/1988 | Namba et al. | 180/197 |
| 4,779,202 | 10/1988 | Leiber | 364/426.03 |
| 4,803,630 | 2/1989 | Takizawa et al. | 364/424.05 |
| 4,805,102 | 2/1989 | Ise et al. | 364/424.05 |
| 4,809,183 | 2/1989 | Eckert | 364/426.02 |
| 4,811,808 | 3/1989 | Matsumoto et al. | 180/197 |
| 4,821,606 | 4/1989 | Leiber | 180/197 |
| 4,850,446 | 7/1989 | Leiber et al. | 180/197 |
| 4,872,117 | 10/1989 | Suzuki et al. | 364/431.05 |

Primary Examiner—Mitchell J. Hill
Attorney, Agent, or Firm—Allan J. Lippa; Peter Abolins

[57] ABSTRACT

A feedback control system for controlling the wheel slip of a vehicle having at least one of a plurality of wheels coupled to an internal combustion engine. An engine feedback control system and suspension feedback control system operate concurrently. The suspension feedback control system includes a plurality of hydraulic actuators each coupled to one of the wheels and each responsive to a separate command signal. In response to a detection of wheel slip, the suspension feedback control system applies both a downward normal force and lateral cornering force (unless the vehicle is traveling in a straight line) to each of the wheels. The engine feedback control system is responsive to a measurement of intake manifold pressure which is a predictor of engine torque output before it occurs. Accordingly, the engine feedback control system promptly reduces engine torque output during slip conditions for improving vehicular stability.

7 Claims, 4 Drawing Sheets

WHEEL SLIP CONTROL UTILIZING ACTIVE SUSPENSION

BACKGROUND OF THE INVENTION

The field of the invention relates to controlling the wheel slip of a driven wheel coupled to an internal combustion engine.

When a vehicle (such as an automobile, truck or motorcycle) accelerates over a slippery surface, the engine torque applied to the driven wheel may cause abrupt acceleration or wheel spin. A temporary loss in vehicle control may result. An approach towards solving the problem of wheel slip is disclosed in German patents 2058819 and 2832739 wherein the engine throttle is controlled in inverse relation to a measured difference in rotation between a driven wheel and a nondriven wheel. U.S. Pat. No. 4,554,990 issued to Kamiya et al. discloses a control system wherein the difference in rotation between a driven wheel and a nondriven wheel is used as a feedback variable.

The inventors herein have recognized numerous disadvantages of these prior approaches. One disadvantage is that torque is removed from the drive wheel by controlling an engine input (throttle). Thus, torque is not removed from the drive wheel until after a time delay through the engine is incurred. Another disadvantage is that the feedback variables for engine torque output are derived from delayed variables such as engine speed and wheel speed. These feedback variables are therefore delayed by a time delay through the engine and drivetrain resulting in a feedback loop with poor transient response time and stability.

An approach to wheel slip control for double axle vehicles is disclosed in French patent reference FR 2590-525 issued to Rena. More specifically, in response to a detection of wheel slip in one of the double axles, the wheel of the adjacent axle is hydraulically raised thereby increasing the load on the other axle. A disadvantage of this approach is that the net force against all the wheels remains the same regardless of suspension control. Thus, cornering forces on the wheels are not improved and loss of vehicular control may ensue. Another disadvantage is that the slip control is limited only to the double axles rather than the entire vehicle, therefore, the disclosed slip control does not appear to be applicable to automobiles. Still another disadvantage of this approach is that the engine continues to apply torque to the slipping wheel. The inventor herein contends that there is no teaching or suggestion of coordinated engine/suspension control. The inventor further contends that the disclosure of the Rena patent addresses the problem of traction control rather than vehicular control while accelerating over slippery surfaces.

SUMMARY OF THE INVENTION

An object of the present invention is to provide both suspension control and engine control to reduce wheel slip by increasing both normal and cornering forces (unless vehicle is traveling in a straight line) on all wheels and concurrently reducing engine torque output.

The above object is achieved, and the problems and disadvantages of prior approaches overcome, by providing both a method and feedback control system for controlling wheel slip of a motor vehicle having at least one driven wheel coupled to an internal combustion engine. In one aspect of the invention, the feedback control system comprises: active suspension means for applying a downward normal force and lateral cornering force to each of the wheels, the active suspension means comprising a plurality of hydraulic actuators each coupled to one of the wheels and each responsive to a separate command signal; detection means for generating a slippage signal when any of the wheels slips beyond a desired value; and suspension control means for generating the command signals in response to the slippage signal and for applying each of the command signals to each of the plurality of hydraulic actuators thereby increasing both the normal force and lateral force applied to all the wheels.

The above aspect of the invention provides an advantage of applying both downward normal forces and lateral cornering forces to both driven and nondriven wheels thereby promptly reducing wheel slip and markedly improving vehicle stability when encountering slip conditions.

In another aspect of the invention, the feedback control system comprises: active suspension means for applying a downward force to each of the wheels, the active suspension means comprising a plurality of hydraulic actuators each coupled to one of the wheels and each responsive to a separate downward command signal; first feedback means for generating a first feedback variable related to wheel slippage when any of the wheels slips beyond a desired value; suspension feedback control means for generating the downward command signal in relation to the first feedback variable to reduce wheel slip; second feedback means for measuring intake manifold pressure and for providing a second feedback variable related to engine torque output before it is delivered by the engine; third feedback means for delaying the measurement of intake manifold pressure to provide a third feedback variable related to torque output of the engine; engine feedback control means responsive to the first feedback variable and the second feedback variable and the third feedback variable for providing a second feedback control signal; and a servo responsive to the second feedback control signal and coupled to the throttle for regulating the engine to reduce the wheel slip.

The above aspect of the invention provides an advantage of applying both downward normal forces and lateral cornering forces to both driven and nondriven wheels thereby promptly reducing wheel slip and markedly improving vehicle stability when encountering slip conditions. Another advantage is provided by having an engine feedback control system operating concurrently with the suspension feedback control system wherein the engine feedback control system utilizes manifold pressure as a feedback variable. Since manifold pressure provides a measurement of engine torque output before it is delivered, the engine feedback control system provides a faster and more stable response time than heretofore possible.

BRIEF DESCRIPTION OF THE DRAWINGS

The above objects and advantages are better understood by reading an example of an embodiment, referred to herein as the preferred embodiment, which utilizes the invention to advantage with reference to the drawings wherein.

DESCRIPTION OF THE PREFERRED EMBODIMENT

Figure 1:
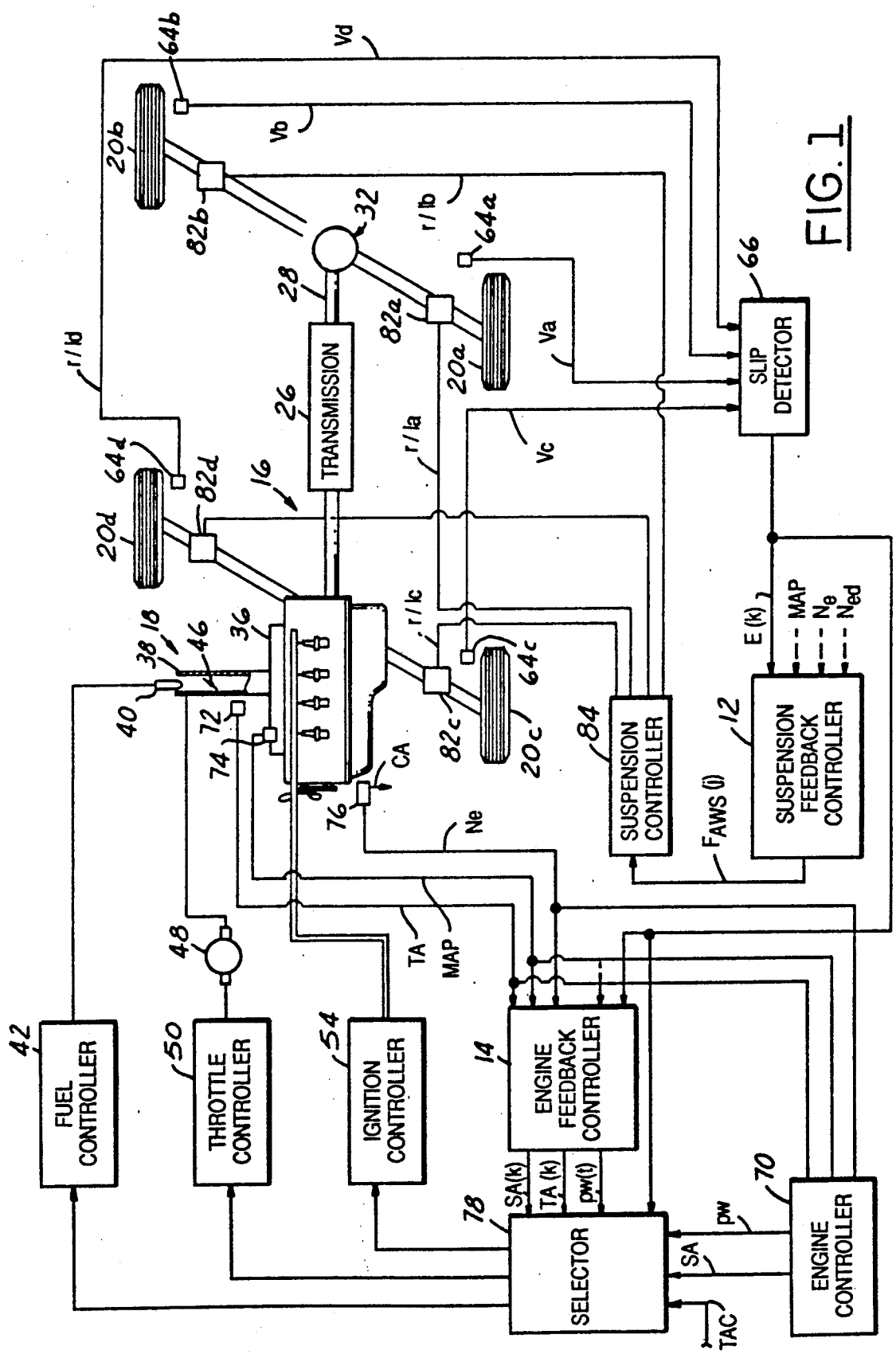
FIG. 1 is a block diagram showing a conventional motor vehicle coupled to the feedback control systems described herein.

Referring first to FIG. 1, in general terms which are described in greater detail hereinafter, suspension feedback controller 12 and engine feedback controller 14 are shown as feedback control systems receiving inputs from, and controlling, motor vehicle 16 when detected wheel slip exceeds a desired or preselected value.

Motor vehicle 16 is shown in this particular example having an internal combustion engine 18 coupled to drive wheels 20a and 20b, transmission/torque convertor 26, driveshaft 28 and differential/axle 32. Although a conventional rear wheel drive vehicle is shown in the example of FIG. 1, the invention is also used to advantage with front wheel drive and four-wheel drive vehicles.

Engine 18 is shown in this example including an intake manifold 36 for inducting an air/fuel mixture therein via air/fuel intake 38. Fuel injector 40, shown as a portion of a central fuel injected system in this example, injects fuel into air/fuel intake 38 under control of conventional fuel controller 42. Throttle plate 46 is here shown actuated by servo motor 48 in response to throttle controller 50 for adjusting flow through air/fuel intake 38 in a conventional manner. Conventional ignition controller 54 is shown providing ignition timing and appropriate ignition spark to spark plugs 56, 58, 60 and 62.

It is to be understood that the feedback control systems described herein may be used to advantage with any type of combustion engine such as, for example, carbureted engines, multiport fuel injected engines, and direct fuel injected engines. Further, the feedback control systems are not limited to automobiles, but may be used to advantage with any apparatus having an engine coupled to a drive wheel such as, for example, a motorcycle.

Wheel speed sensors 64a and 64b are shown coupled to respective wheels 20a and 20b for providing slip detector 66 with corresponding wheel speed signals Va and Vb. Similarly, wheel speed sensors 64c and 64d are shown coupled to respective wheels 20c and 20d for providing slip detector 66 with corresponding speed signals Vc and Vd. Slip detector 66 determines if the slippage of any wheel is beyond a threshold value such as 20% slippage and in response, provides error signal E(k) each sample instant k. In this particular example, the derivative of wheel speed is taken to determine excess wheel slippage. A simple comparison of driven wheel speed to nondriven wheel speed could also be used to determine excessive slippage. For example, a simple velocity comparison of driven wheel 20a to nondriven wheel 20c may be used to determine excess wheel slippage. In other embodiments, commercially available Doppler radar units have been used to advantage.

As described in greater detail later herein, engine feedback controller 14 provides spark advance signal SA(k), sampled throttle angle signal TA(k), and sampled fuel pulse width signal pw(k). Engine feedback controller 14 is shown being responsive to signal E(k) from slip detector 66, throttle angle signal TA from throttle angle sensor 72, manifold pressure signal MAP from manifold pressure sensor 74, and engine speed signal Ne from rotation sensor 76.

In this particular example, conventional engine controller 70 is shown providing spark advance signal SA and fuel pulse width signal pw to selector 78. Throttle angle command signal $T_{AC}$ from a conventional driver actuable throttle is also shown coupled to selector 78.

In response to signal E(k) from slip detector 76, selector 78 selects either $T_{AC}$, SA, and pw, or the corresponding feedback signals SA(k), TA(k) and pw(k). Stated another way, when wheel slip is below a threshold value, selector 78 selects signals from engine controller 70 and the driver actuable throttle. When wheel slip is above a threshold value, selector 78 selects signals from engine feedback controller 14 such that wheel slip is reduced by engine control as described in greater detail later herein.

Continuing with FIG. 1, motor vehicle 16 is shown having a conventional active suspension system including hydraulic assemblies 82a, 82b, 82c, and 82d coupled to respective wheels 20a, 20b, 20c, and 20d. Each hydraulic assembly is shown actuated by separate raise/-lower command signals r/1a, r/1b, r/1c, and r/1d from suspension controller 84. For this particular example, suspension controller 84 is responsive to anti-wheel slip force signal $F_{aws}(j)$ from suspension feedback controller 12.

Figure 2:
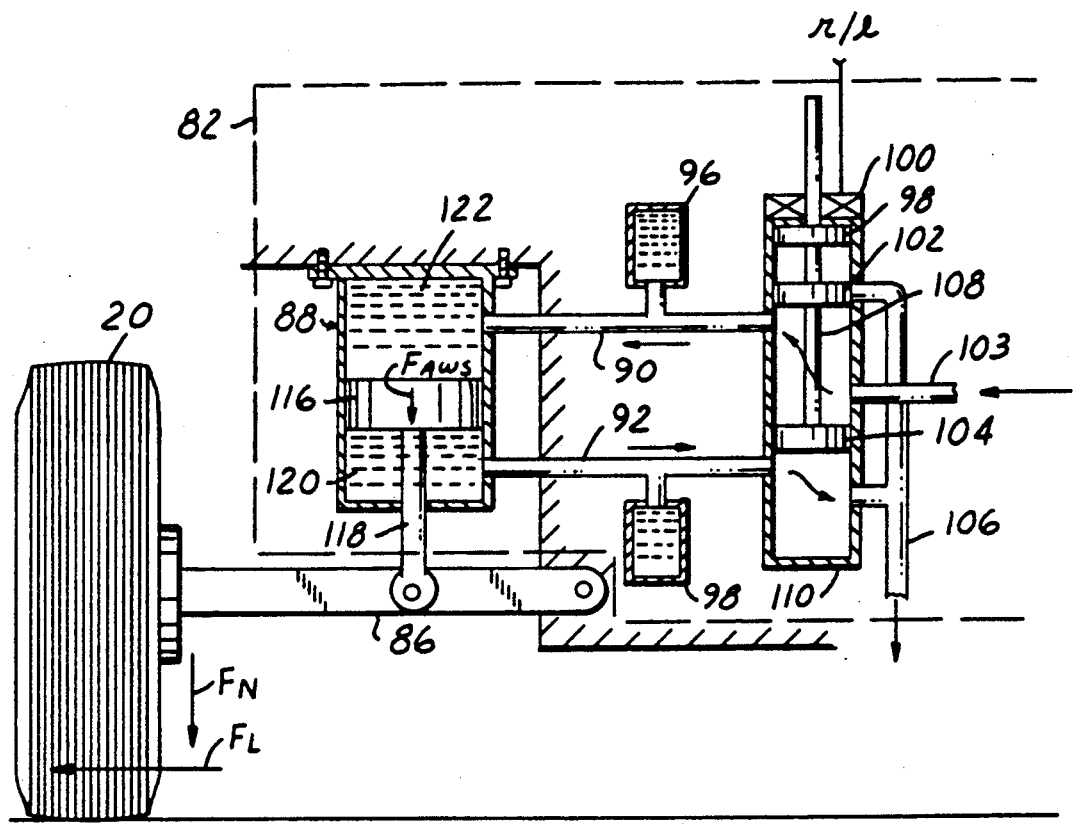
FIG. 2 shows a portion of the embodiment shown in FIG. 1 relating to hydraulic control of the vehicle's wheels.

Referring to FIG. 2, each hydraulic assembly 82 is shown coupled to a wheel 20 via suspension arm 86. Hydraulic assembly 82 is shown including hydraulic actuator 88 coupled to servo valve 94 via hydraulic lines 90 and 92. Hydraulic accumulators 96 and 98 are shown respectively coupled to hydraulic lines 90 and 92. Servo valve 94 is shown coupled to hydraulic supply line 103 and hydraulic return line 106 each of which are coupled to a conventional hydraulic pump (not shown) and accumulator (not shown).

Servo valve 94 is shown including armature 98 electromagnetically coupled to coils 100 which are connected to signal r/1. Armature 98, and valve assemblies 102 and 104, are shown coupled to shaft 108 within housing 110. Shaft 108 is also coupled to return spring 112 (not shown) for supplying a counteractive force to coils 100. Hydraulic actuator 88 is shown including piston 116 coupled to suspension arm 86 via rod 118. Piston 116 is positioned within chamber 120 effectively dividing it into upper chamber 122 and lower chamber 124. Chambers 122 and 124 are shown respectively coupled to hydraulic lines 90 and 92.

In operation, when signal r/1 is active, armature 98 of servo valve 94 is attracted to coils 100. In response, valves 102 and 104 are positioned as shown in FIG. 2 thereby coupling supply line 103 to upper chamber 122 via hydraulic line 90 and coupling lower chamber 124 to return line 106 via hydraulic line 92. Accordingly, piston 16 deflects downwardly exerting both a downward normal force and lateral force (unless vehicle is traveling in a straight line) against wheel 20 via suspension arm 86. When signal r/1 is inactive, return spring 112 (not shown) positions valve assemblies 102 and 104 such that lower chamber 124 is coupled to supply line 103 and upper chamber 122 is coupled to return line 106. In response, piston 16 deflects upwardly thereby exerting an upward force on wheel 20.

Figure 3:
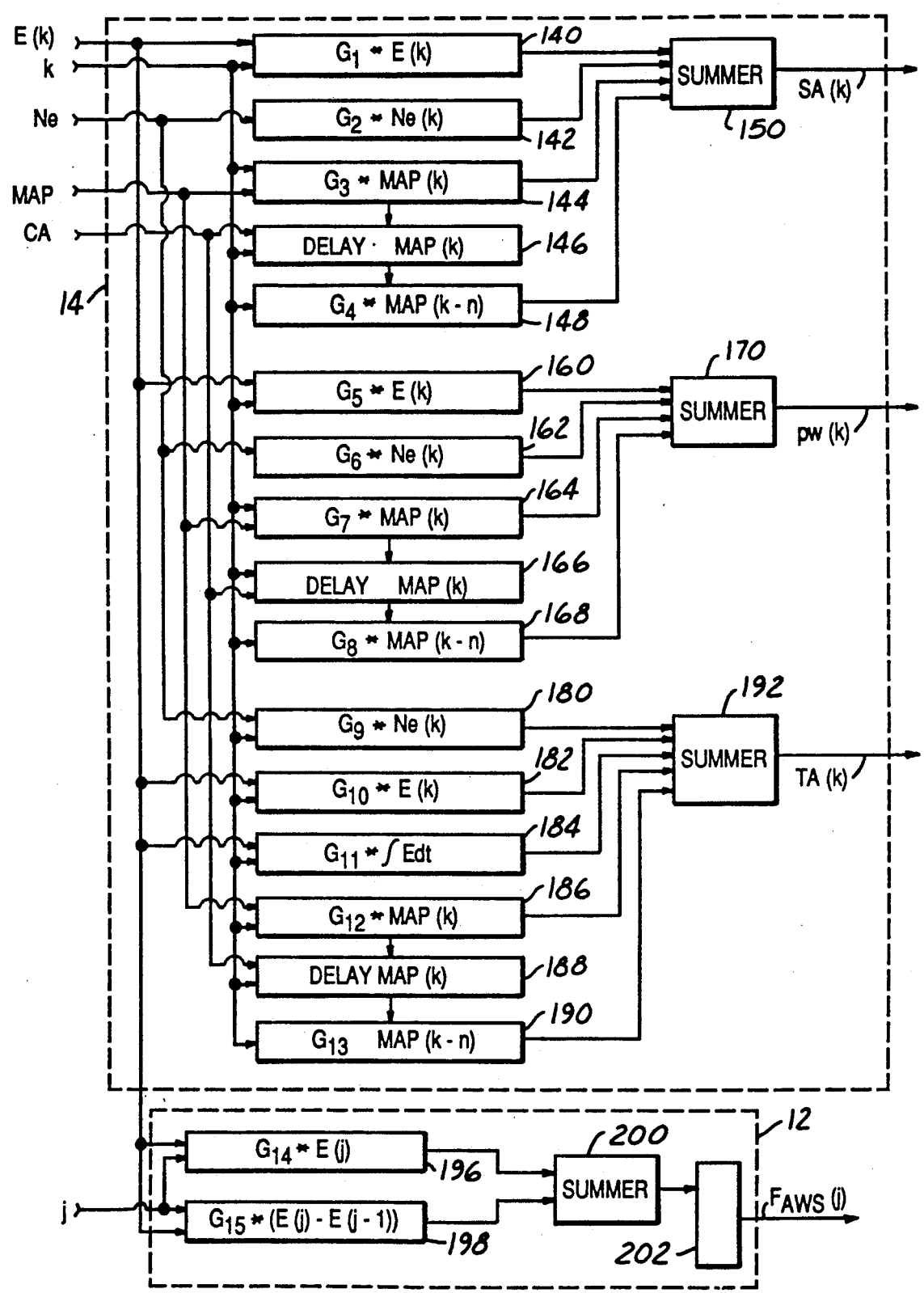
FIG. 3 is a flowchart of the process steps performed by the control systems shown in FIG. 1.

Referring now to FIG. 3, and also referring back to FIG. 1, feedback suspension controller 12 and engine feedback controller 14 are shown schematically as a flowchart of computational and decision making steps represented as blocks. Each block shown herein describes an operation performed by the feedback controllers. It is noted that these operations may also be performed by discrete components wherein each block would comprise an array of circuits such as, for example, IC adders and IC multipliers.

A description of feedback engine controller 14 is first provided. More specifically, error signal $E(k)$ is multiplied by gain constant $G_1$ in step 140 once each sample period to generate feedback variable $G_1*E(k)$ related to wheel slip. Feedback variable $G_2*N_e(k)$ is shown generated by multiplication of gain constant $G_2$ times engine speed NE once sample period in step 142. During step 144, manifold pressure signal MAP is multiplied by gain constant $G_3$ each sample period to generate feedback variable $G_3*MAP(k)$. It is noted that manifold pressure signal MAP provides a measurement of engine torque output before the torque is actually delivered by engine 18. Thus, feedback variable $G_3*MAP(k)$ provides engine feedback controller 14 with a faster and more stable response time than heretofore possible. Referring to steps 146 and 148, sampled signal MAP(k) is delayed for an integer number of engine cycles (n) such that feedback variable $G_4*MAP(k-n)$ corresponds with the actual torque delivered by engine 18. The feedback variables generated by steps 140, 142, 144, and 148 are summed in summer 150 to generate feedback control signal SA(k) as shown by the following equation:

$$SA(k) = G_1*E(k) + G_{hd} 2*Ne(k) + G_3*MAP(k) + G_4*MAP(k-n)$$

Referring to steps 160, 162, 164, 166, 168, and 170 feedback control signal pw(k) is generated in a manner similar to the generation of feedback control signal SA(k) described above. The pulse width of feedback control signal pw(k) controls fuel delivery by fuel injector 40 such that engine torque is reduced in response to a detection of wheel slip. Feedback control signal pw(k) is represented by the following equation:

$$pw(k) = G_5*E(k) + G_6*Ne(k) + G_7*MAP(k) + G_8*MAP(k-n)$$

During steps 180 and 182, feedback variable multiplied by gain constant $G_9$ and feedback variable $E(k)$ is multiplied by gain constant $G_{10}$. Feedback variable $E(k)$ is also stored each sample period and successive stored values added to form the integral of $E(k)$. This integral value is than multiplied by gain constant $G_{11}$ each sample period to generate feedback variable $G_{11}*\int Edt$ during step 184. Feedback variable MAP(k) is multiplied by gain constant $G_{12}$ during step 186 to generate feedback variable $G_{12}*MAP(k)$. Feedback variable MAP(k) is then delayed by an integer number of combustion cycles such that feedback variable $G_{13}*MAP(k-n)$ is generated to correlate with actual delivery of engine torque as shown by steps 188 and 190. Each of these feedback variables is summed each sample period in summer 192 to generate feedback control signal TA(k) as shown by the following equation:

$$TA(k) = G_9*Ne(k) + G_{10}*E(k) + G_{11}*\int Edt + G_{12}*MAP(k) + G_{13}*MAP(k-n)$$

Feedback control system TA(k) controls the engine throttle during a wheel slip condition for reducing engine torque and, accordingly, wheel slip.

It is noted that feedback control signals TA(k), pw(k), and SA(k) reduce engine torque output as a function of the above feedback variables. Since manifold pressure signal MAP is used as a feedback variable, an indication of engine torque output is provided before the torque is actually delivered by engine 18. Accordingly, engine feedback controller 14 provides a faster and more stable response than heretofore possible.

Figure 4:
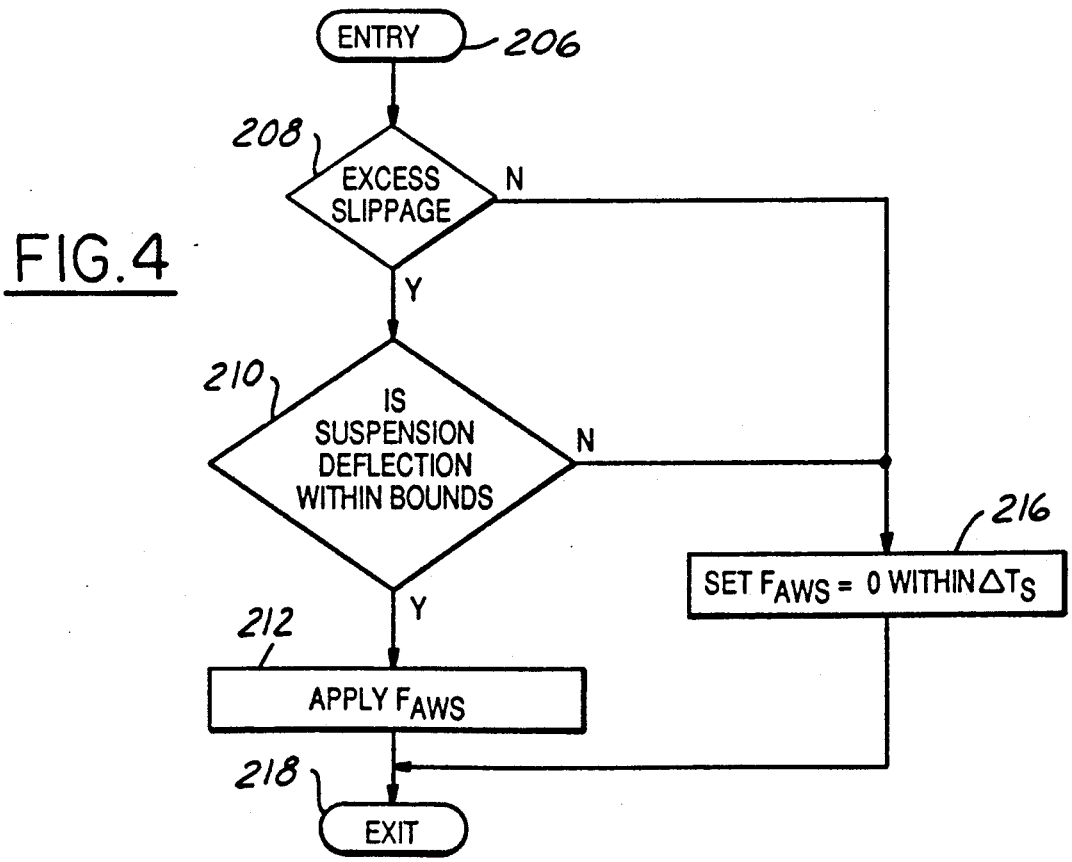
FIG. 4 is a flowchart of the process steps performed by a portion of the control systems shown in FIG. 1.

Continuing with FIG. 3, and also referring to FIG. 4, the operation of suspension feedback controller 12 is now described. During process step 196, error signal E is sampled once each sample interval j and multiplied by gain constant $G_{14}$. Each sample period error signal E is also stored for adding the stored value to the subsequent sampled error signal (see step 198). The difference between error signals from two successive samples is then taken and multiplied by gain constant to generate feedback variable $G_{15}*[E(j)-E(j-1)]$. Thus, a proportional derivative feedback variable is formed. Both feedback variables are summed in summer 200 to generate anti-wheel slip control signal $F_{aws}(j)$ as shown by the following equation:

$$F_{aws}(j) = G_{14}*E(j) + G_{15}*[E(j)-E(j-1)]$$

Normal force feedback control signal $F_{aws}$ is then limited by limiting switch 202 as described with particular reference to FIG. 4. More specifically, when excess wheel slip is detected (see step 208), and deflection of hydraulic actuator 88 is within predetermined limits (see step 210), then feedback control signal $F_{aws}(j)$ is coupled to suspension controller 84. If the conditions of step 208 or step 210 are not present, then feedback control signal $F_{aws}(j)$ is set to zero within a predetermined time $\Delta T_S$ as shown in step 216. Thus, in response to a detection of excess wheel slip, feedback control signal $F_{aws}(j)$ is applied to hydraulic assemblies 82 only until the maximum deflection of the hydraulic assembly has incurred. After the maximum deflection of hydraulic assembly 82 has been reached, feedback control signal $F_{aws}(j)$ is set to zero. In operation, the force $F_{aws}$ applied via hydraulic assemblies 82 results in both a downward normal force $F_N$ and lateral cornering force $F_L$ applied to each wheel 20a-d. The inventor herein has found that these forces may be up to 1g during wheel slip conditions. Accordingly, the application of both a normal force $F_N$ and lateral or cornering force $F_L$ has resulted in greater vehicular stability during wheel slip conditions than heretofore possible. It is noted that the calculation of $F_{aws}(j)$ can be done either using the above feedback expression or as an open loop expression proportional to the weight carried by a wheel.

Figure 5A:
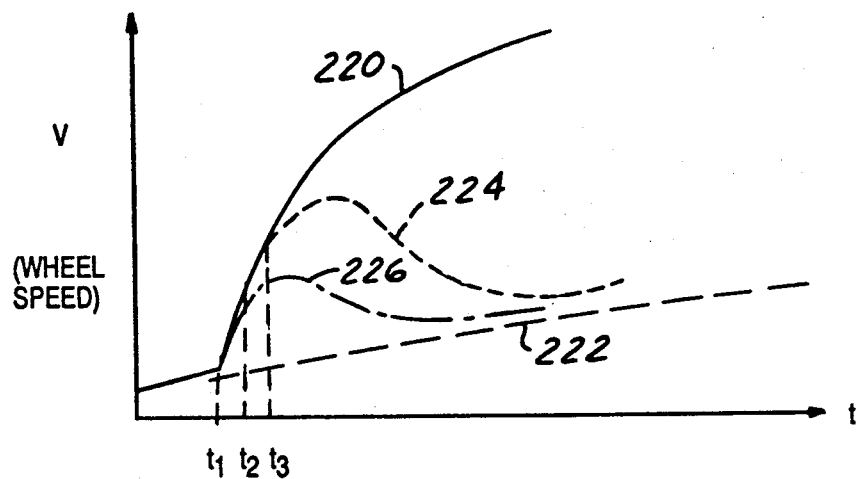
FIG. 5A–5D are a graphical representation of the response time of the feedback control systems shown in FIG. 1.

The coordinated operation of suspension feedback controller 12 and engine feedback controller 14 during wheel slip conditions is shown graphically in FIGS. 5A-5D. Referring first to FIG. 5A, wheel speed V is shown on line 220 rapidly increasing at time $t_1$ when encountering a slippery surface during acceleration. Dashed line 222 represents wheel speed V while accelerating on dry surface conditions. Without any form of wheel slip control, the driven wheel(s) accelerates rapidly at time $t_1$ as shown by line 220. The effect of engine feedback controller 14, operating by itself, on wheel slip is shown by line 224. Line 226 represents corrected wheel speed by the coordinated operation of both suspension feedback controller 12 and engine feedback controller 14.

Figure 5B:
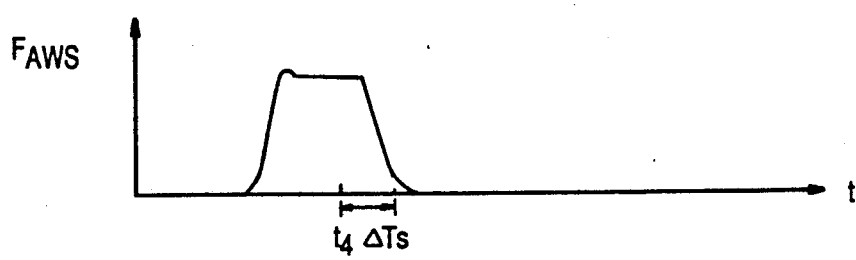
Figure 5C:
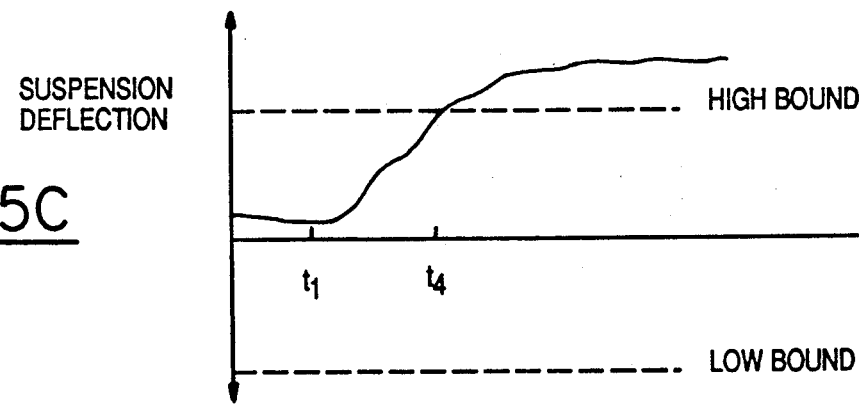

Referring to FIG. 5B, a graphical representation of feedback control signal $F_{aws}$ is shown. More specifically, the operation of suspension feedback control system 12 results in the application of force $F_{aws}$ by time $t_2$. The resulting effect in controlling wheel slip is shown in FIG. 5A as line 226 begins to flatten at time $t_3$. Referring back to FIG. 5B, and also referring to FIG. 5C, maximum deflection of hydraulic assembly 82 occurs at time $t_4$. In response, limiting switch 202 reduces $F_{aws}$ to zero during time $\Delta T_S$.

Figure 5D:
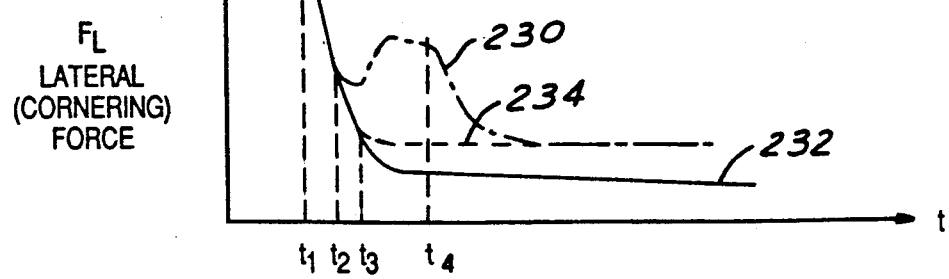

The effect of coordinated control by both suspension feedback controller 12 and engine feedback controller 14 on the cornering or lateral force $F_L$ of each wheel $20_{a-d}$ is graphically shown by line 230 in FIG. 5D. It is noted that line 232 represents lateral $F_L$ without wheel slip control, and line 234 represents lateral force $F_L$ when wheel slip is controlled only by engine feedback controller 14. Without the operation of suspension feedback controller 12, it is seen that the lateral force $F_L$ falls dramatically during slip conditions. On the other hand, operation of suspension feedback controller 12 results in an increased cornering force and, accordingly, significantly improved vehicular stability during slip conditions.

In summary, engine feedback controller 14 provides a faster response time than heretofore possible in controlling wheel slip due to the utilization of manifold pressure (MAP) as a feedback variable. Stated another way, the invention herein utilizes a feedback variable (MAP) representative of engine torque output before the torque is actually delivered. Further, the novel use of suspension feedback controller 12 provides all the wheels with both an increased normal force ($F_N$) and an increased lateral cornering force ($F_L$) for markedly increased vehicular stability during slip conditions.

This concludes the Description of the Preferred Embodiment. The reading of it by those skilled in the art will bring to mind many alterations and modifications without departing from the spirit and scope of the invention. Accordingly, it is intended that the invention only be limited by the following claims.

What is claimed:

1. An apparatus for controlling wheel slip of a motor vehicle having a plurality of wheels including at least one driven wheel coupled to an internal combustion engine, comprising:
    active suspension means for generating a downward normal force on each of the wheels, said active suspension means comprising a plurality of actuator means each coupled to one of the wheels and each responsive to a command signal for generating said downward normal force;
    detection means for generating a slippage signal when any of the wheels slips beyond a desired value; and
    suspension control means for generating said command signal in response to said slippage signal and for applying said command signal to each of said plurality of actuator means thereby increasing both the normal force and lateral force applied to all the wheels.

2. The apparatus recited in claim 1 wherein said suspension means applies said downward force and said lateral force to wheels.

3. An apparatus for controlling wheel slip of a motor vehicle having a plurality of wheels including at least one driven wheel coupled to an internal combustion engine, comprising:
    active suspension means for applying a downward force to each of the wheels, said active suspension means comprising a plurality of hydraulic actuators each coupled to one of the wheels and each responsive to a downward command signal for applying said downward force;
    detection means for generating a slippage signal when any of the wheels slips beyond a desired value;
    suspension control means for generating said downward command signal in relation to said slippage signal;
    measuring means for determining intake manifold pressure of the internal combustion engine wherein said manifold pressure is related to engine torque output before actual delivery of said torque to the wheel; and
    feedback control means responsive to said slippage signal and said manifold pressure for regulating said engine torque output to control said slippage.

4. The apparatus recited in claim 3 wherein said feedback control means regulates said engine torque output by regulating engine throttle.

5. A feedback control system for controlling the wheel slip of a vehicle having at least one of a plurality of wheels coupled to an internal combustion engine which includes an intake manifold and throttle for inducting air therethrough, comprising:
    active suspension means for applying a downward force to each of the wheels, said active suspension means comprising a plurality of hydraulic actuators each coupled to one of the wheels and each responsive to a first feedback control signal for applying said downward force;
    detection means for generating a first feedback variable related to wheel slippage when any of the wheels slips beyond a desired value;
    suspension feedback control means for generating said first feedback control signal in relation to said first feedback variable to reduce wheel slip;
    measurement means for measuring intake manifold pressure and for providing a second feedback variable related to engine torque output before it is delivered by the engine;
    delay means for delaying said measurement of intake manifold pressure to provide a third feedback variable related to torque output of the engine;
    engine feedback control means responsive to said first feedback variable and said second feedback variable and said third feedback variable for providing a second feedback control signal; and
    a servo responsive to said second feedback control signal and coupled to the throttle for regulating the engine to reduce the wheel slip.

6. A method for controlling wheel slip of a motor vehicle having at least one driven wheel coupled to an internal combustion engine, comprising the steps of:
    applying a downward normal force and lateral cornering force to each of the wheels by an active suspension system comprising a plurality of hydraulic actuators each responsive to a command signal;

generating a slippage signal when any of the wheels slips beyond a desired value; and generating said command signal in response to said slippage signal and applying said command signal to each of said plurality of hydraulic actuators thereby increasing both the normal force and lateral force applied to all the wheels.

7. A method for controlling wheel slip of a motor vehicle having at least one driven wheel coupled to an internal combustion engine, comprising the steps of:

applying a downward force to each of the wheels by an active suspension means comprising a plurality of hydraulic actuators each coupled to one of the wheels and each responsive to a downward command signal;

generating a slippage signal when any of the wheels slips beyond a desired value;

generating said downward command signal in relation to said slippage signal;

determining intake manifold pressure of the internal combustion engine wherein said manifold pressure is related to engine torque output before actual delivery of said torque to the wheel; and regulating said engine torque output to control said slippage in response to said slippage signal and said manifold pressure.

* * * * *